(12) United States Patent
Furuya

(10) Patent No.: US 6,399,236 B1
(45) Date of Patent: Jun. 4, 2002

(54) GAS DIFFUSION ELECTRODE ASSEMBLIES AND PROCESSES FOR PRODUCING THE SAME

(75) Inventor: Nagakazu Furuya, 6-24-604, Kitaguchi 1-chome, Kofu-shi, Yamanashi (JP)

(73) Assignees: Nagakazu Furuya, Yamanashi; Toagosei Co., Ltd.; Mitsui Chemicals, Inc., both of Tokyo; Kaneka Corporation, Osaka, all of (JP)

( * ) Notice: Subject to any disclaimer, the term of this patent is extended or adjusted under 35 U.S.C. 154(b) by 0 days.

(21) Appl. No.: 09/504,866

(22) Filed: Feb. 16, 2000

(30) Foreign Application Priority Data

| Feb. 16, 1999 | (JP) | ............................................. 11-037534 |
| Feb. 16, 1999 | (JP) | ............................................. 11-037535 |
| Feb. 17, 1999 | (JP) | ............................................. 11-038961 |
| Feb. 23, 1999 | (JP) | ............................................. 11-045071 |
| Mar. 24, 1999 | (JP) | ............................................. 11-080145 |

(51) Int. Cl.$^7$ .............................................. H01M 4/86
(52) U.S. Cl. ........................ 429/40; 429/41; 429/237; 429/233; 429/245; 429/209; 429/211; 429/219; 429/44

(58) Field of Search ................................. 429/237, 233, 429/245, 209, 211, 219, 40, 41, 44

(56) References Cited

U.S. PATENT DOCUMENTS 5,154,993 A * 10/1992 Beatty ........................ 429/211
5,993,999 A * 11/1999 Rivers et al. ................ 429/244

* cited by examiner

Primary Examiner—Gabrielle Brouillette
Assistant Examiner—Angela J. Martin
(74) Attorney, Agent, or Firm—Young & Thompson

(57) ABSTRACT

A gas diffusion electrode assembly comprising: a gas diffusion electrode; and a metallic or resinous edging material bonded to a peripheral part of the electrode. The invention also relates to a gas diffusion electrode assembly comprising: a gas diffusion electrode; and a metallic terminal bonded to the electrode. The invention further relates to a gas diffusion electrode assembly comprising: a gas diffusion electrode; and a structure for connection, which comprises a combination of a thin silver sheet and a reinforcing material comprising a tough metal as a base, the structure for connection being bonded to a peripheral part of the gas diffusion electrode. Also disclosed are processes for producing these gas diffusion electrode assemblies.

4 Claims, 4 Drawing Sheets

GAS DIFFUSION ELECTRODE ASSEMBLIES AND PROCESSES FOR PRODUCING THE SAME

FIELD OF THE INVENTION

The present invention relates to gas diffusion electrode assemblies comprising a gas diffusion electrode and bonded thereto a metallic terminal, metallic edging material, resinous edging material, or structure for connection and to processes for producing the electrode assemblies. More particularly, the invention relates to gas diffusion electrode assemblies which each has bonded thereto a metallic terminal, edging material, or structure for connection and which, when used as a gas diffusion electrode for the electrolysis of sodium chloride, can be easily attached to an electrode pan and attain easy collection of electrons. The invention further relates to processes for producing the electrode assemblies and a method for bonding a silver material to a collector sheet as a gas diffusion electrode constituent.

BACKGROUND OF THE INVENTION

In the sodium chloride electrolysis industry, the leakage of an electrolytic solution or decomposition gas from the cathode part in the case of using a gas diffusion electrode as an oxygen cathode has conventionally been prevented by sandwiching the electrode together with a packing between electrolytic cell frames.

However, electrolytic cells for practical use employ as the cathode a large electrode plate having dimensions of 1.2 m×2.4 m. Electrode plates having a size of 1 m$^2$ or larger have been found to have problems, for example, that it is virtually difficult to obtain such a large electrode as a single electrode plate, that the gas diffusion electrodes are difficult to handle because they have low mechanical strength and are hence apt to be deformed by their own weight, and that it is difficult to sufficiently feed electricity to the gas diffusion electrodes only through the periphery thereof.

Investigations are being made on a technique for attaching, for example, two or more separate small electrode plates to an electrode pan. This technique comprises employing gas diffusion electrodes each having a collector sheet gauze extending beyond the periphery of the electrode, welding the projecting parts of the gauzes to an electrode pan with a laser, and sealing the peripheral parts of the gas diffusion electrodes by applying a sealing material to the welded parts of the gauzes.

However, the technique described above is impractical because there is no sealing material which stably performs its function over long in caustic soda having a high temperature and high concentration and, hence, long-term operation results in liquid leakage. The liquid leakage not only reduces electrolytic performance but is causative of a decrease in electrode life.

There has been a desire for means which eliminates the liquid leakage, i.e., a gas diffusion electrode which can be tenaciously bonded to an electrolytic cell feeder part and easily attached to an electrolytic cell and which facilitates collection of electrons and sealing.

The joint between a gas diffusion electrode and an electrolytic cell feeder part, especially that part of the gas diffusion electrode which has a low bonding strength, is apt to suffer liquid leakage in long-term operation in caustic soda having a high temperature and high concentration. There is hence a desire for a technique for bonding a silver sheet as an edging material to a gas diffusion electrode, in particular, a technique for more tenaciously bonding the silver sheet to the surface silver material of a collector sheet.

SUMMARY OF THE INVENTION

An object of the present invention is to provide a gas diffusion electrode assembly which has satisfactory electrode plate handleability, can be easily sealed, and are free from liquid leakage.

Another object of the invention is to provide a process for producing the electrode assembly.

A still other object of the invention is to provide a method for bonding a gas diffusion electrode constituent to a silver material to obtain a gas diffusion electrode which shows a stable electrode performance over a long period of time and has a long life.

Other objects and effects of the present invention will become more apparent from the following description.

The above-described objectives of the present invention have been achieved by providing the following gas diffusion electrode assemblies (1) to (8) and processes for producing a gas diffusion electrode assembly (9) to (16).

(1) A gas diffusion electrode assembly comprising:
   a gas diffusion electrode; and
   a metallic edging material bonded to a peripheral part of the electrode.

(2) The gas diffusion electrode assembly of item (1) above, wherein the metallic edging material comprises a metal selected from the group consisting of silver, silver alloys, gold, platinum and palladium or comprises nickel or a nickel-based alloy, coated with any of these metals.

(3) A gas diffusion electrode assembly comprising:
   a gas diffusion electrode; and
   a metallic terminal bonded to the electrode.

(4) The gas diffusion electrode assembly of item (3) above, wherein the metallic terminal comprises a metal selected from the group consisting of silver, silver alloys, gold, platinum and palladium or comprises nickel or a nickel-based alloy, coated with any of these metals.

(5) A gas diffusion electrode assembly comprising:
   a gas diffusion electrode; and
   a resinous edging material bonded to a peripheral part of the electrode.

(6) The gas diffusion electrode of item (5) above, wherein the resinous edging material comprises a fluororesin or poly(phenylene sulfide).

(7) A gas diffusion electrode assembly comprising:
   a gas diffusion electrode; and
   a structure for connection, which comprises a combination of a thin silver sheet and a reinforcing material comprising a tough metal as a base, the structure for connection being bonded to a peripheral part of the gas diffusion electrode.

(8) The gas diffusion electrode assembly of item (7) above, wherein the reinforcing material comprises a metal selected from the group consisting of nickel, stainless steel and copper.

(9) A process for producing a gas diffusion electrode assembly, which comprises:
   bringing a metallic edging material into contact with a peripheral part of a gas diffusion electrode which comprises superposed gas diffusion electrode constituents comprising a reaction layer sheet, a gas feed layer sheet and a collector sheet and which contains a fluororesin; and hot-pressing the assemblage at a temperature of from the melting point of the fluororesin to 400° C. and at a pressing pressure of 5 kg/cm² or higher to bond the edging material to the gas diffusion electrode.

(10) The process of item (9) above, wherein the metallic edging material comprises a metal selected from the group consisting of silver, silver alloys, gold, platinum and palladium or comprises nickel or a nickel-based alloy, coated with any of these metals.

(11) A process for producing a gas diffusion electrode assembly, which comprises:

superposing a metallic terminal on part of a gas diffusion electrode which comprises superposed gas diffusion electrode constituents comprising a reaction layer sheet, a gas feed layer sheet and a collector sheet and which contains a fluororesin; and hot-pressing the assemblage at a temperature of from the melting point of the fluororesin to 400° C. and at a pressing pressure of 5 kg/cm² or higher.

(12) The process of item (11) above, wherein the metallic terminal comprises a metal selected from the group consisting of silver, silver alloys, gold, platinum and palladium or comprises nickel or a nickel-based alloy, coated with any of these metals.

(13) A process for producing a gas diffusion electrode assembly, which comprises:

bonding a silver material to a collector sheet;

prior to the bonding, applying fine silver particles to the bonding surface of at least one of the collector sheet and the silver material; and then hot-pressing the silver material with respect to the collector sheet.

(14) The process of item (13) above, further comprises roughening the bonding surface of at least one of the collector sheet and the silver material.

(15) The process of item (13) above, wherein the hot-pressing is carried out at a temperature of from 200 to 400° C. and a pressure of 5 kg/cm² or higher.

(16) A process for producing a gas diffusion electrode assembly, which comprises:

superposing a resinous edging material onto a peripheral part of at least one of a reaction layer and a gas feed layer of a gas diffusion electrode; and hot-pressing the assemblage at a temperature not lower than the melting point of the resin and at a pressing pressure of 10 kg/cm² or higher.

DETAILED DESCRIPTION OF THE INVENTION

Figure 1:
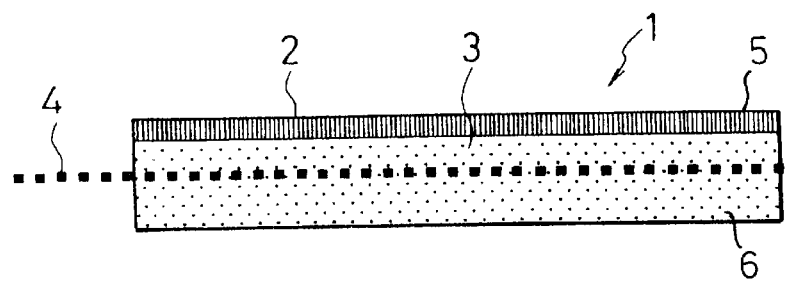
FIG. 1 shows a sectional view of a gas diffusion electrode.

In FIG. 1 is shown a sectional view of a gas diffusion electrode. One of the important constituent elements of a gas diffusion electrode is a collector sheet. In general, the gas diffusion electrode 1 is constituted by a reaction layer 2, a gas feed layer 3, and a collector sheet 4. A process for producing this gas diffusion electrode comprises sandwiching a collector sheet 4 between a reaction layer sheet 5 and a gas feed layer sheet 6 and hot-pressing the assemblage to bond and unite the constituents.

The collector sheet in the gas diffusion electrode is a silver gauze, a silver-coated nickel gauze, a silver-plated foamed nickel gauze, or the like, and is used in such a state that it is embedded in the gas feed layer. In the gas diffusion electrode 1, the surface of the silver gauze has been bonded by hot-pressing to a mixture of carbon black and polytetrafluoroethylene (hereinafter referred to as "PTFE").

In the gas diffusion electrode assembly having a metallic edging material according to the invention, the range over which the metallic edging material covers the gas diffusion electrode is preferably a peripheral part of the electrode. The reason for this is that when the gas diffusion electrode is supported on an electrolytic cell frame, only the peripheral part comes into contact with the electrolytic cell frame and receives a force. Because of this, the metallic edging material generally has a frame shape corresponding to the peripheral part of the gas diffusion electrode. However, from the standpoint of assembly structure or other standpoints, the metallic edging material may be disposed so as to cover not the whole peripheral part but, for example, only two of the four sides of the electrode. Furthermore, the metallic edging material may have a size which is larger than the frame shape corresponding to the peripheral part of the gas diffusion electrode, i.e., which extends outward beyond the periphery of the gas diffusion electrode. In this case, when the gas diffusion electrode assembly is attached to an electrolytic cell in such a manner that those projecting parts of the edging material come into contact with the electrolytic cell frame, then the force applied for fixing the electrode assembly to the electrolytic cell can be received by the projecting parts and be prevented from being imposed on the peripheral parts of the gas diffusion electrode, i.e., on the gas diffusion electrode itself. Thus, the problem that the gas diffusion electrode, which has low strength, is broken is mitigated.

The metallic edging material preferably has such a shape that the part thereof which overlies the gas diffusion electrode is as small as possible because covering a central part of the gas diffusion electrode with the edging material results in a reduced electrolysis area. Namely, it is preferred that the proportion of that overlying part to the area of the gas diffusion electrode be small.

The gas diffusion electrode assembly having a metallic edging material according to the invention will be explained below.

Figure 2:
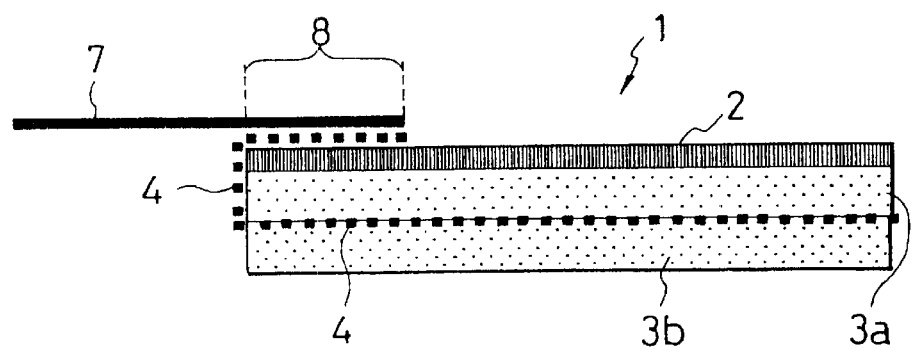
FIG. 2 shows a sectional view of one embodiment of the gas diffusion electrode assembly according to the present invention.

FIG. 2 is sectional view of one embodiment of the gas diffusion electrode assembly of the invention. This assembly employs a gas diffusion electrode 1 which is the same as the gas diffusion electrode 1 shown in FIG. 1. In this assembly, that part of the silver gauze collector sheet 4 which projects from one end of the gas feed layer 3 has been folded so as to overlie the reaction layer 2.

An edging material 7 is used in the invention. The edging material 7 is prepared, for example, from a silver sheet having a thickness of 0.2 mm and a size larger than the gas diffusion electrode 1 by 10 mm for each side, by forming in the center of the sheet a window of a size smaller than the gas diffusion electrode 1 by about 10 mm for each side. This edging material 7 having a window is placed on the gas diffusion electrode 1 so that part (inner part) of the edging material 7 overlies the folded part of the silver gauze 4 as shown in FIG. 2. The resultant assemblage in this state is hot-pressed at 250° C. and at an areal pressure of 100 kg/cm$^2$ in terms of the pressure applied to that overlying part. Thus, the edging material 7 of a frame shape is bonded to the gas diffusion electrode 1. As apparent from the explanation given above, the peripheral part 8 in the assembly shown in FIG. 2 has a width of 5 mm, where bonding is conducted. This peripheral part 8 exactly corresponds to that part of the silver gauze 4 which has been folded so as to overlie the reaction layer 2.

The collector sheet of the gas diffusion electrode 1 is preferably a silver gauze, a porous silver material, a silver-plated nickel gauze, or a silver-plated porous nickel material. The silver sheet for use as the edging material 7 preferably has a thickness of from 0.05 to 0.3 mm. Although the material of this edging material is desirably pure silver, various silver alloys can be used as long as they withstand high temperatures and high pressures. Other metals such as, e.g., gold, platinum, and palladium are usable as long as they are corrosion-resistant and malleable. Also usable are a nickel or nickel alloy base plated with silver and a silver-clad nickel sheet. This is because the interposition of a soft silver gauze or the like between the edging material and the gas diffusion electrode 1 enables the bonding.

The hot-pressing conditions preferably include a temperature of from the melting temperature of the fluororesin used to 400° C. Temperatures lower than 200° C. are undesirable in that the resultant bonding strength is low, while temperatures higher than 400° C. are undesirable in that the PTFE begins to decompose. A high pressure is preferred because too low pressures result in a low bonding strength. The practical range of pressure is about from 20 to 100 kg/cm$^2$.

The edging material 7 to be bonded may have a frame shape so as to form a metal frame, i.e., to cover the whole periphery of the gas diffusion electrode 1, or may be bonded as a collector to part of the periphery of the gas diffusion electrode.

Figure 3:
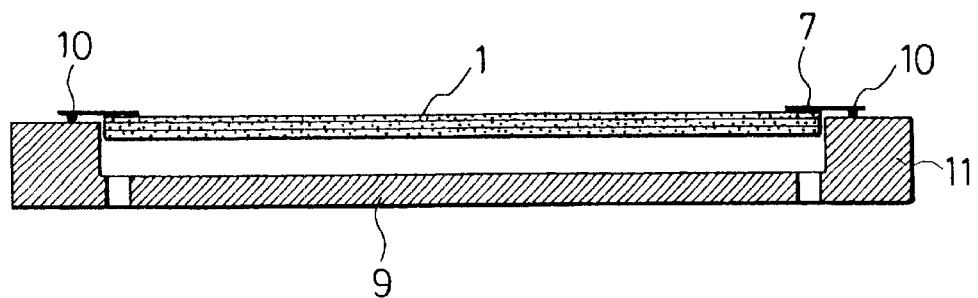
FIG. 3 shows a sectional view of an electrode assembly welded to a cathode pan through welds.

This assembly is welded to a cathode pan, i.e., an electrode pan 9, with a laser, whereby the assembly can be tenaciously fixed through welds 10. FIG. 3 is a sectional view of the electrode assembly welded to the cathode pan 9 through the welds 10. Besides laser welding, other means can be used for the bonding, such as press bonding with resistance heating, press bonding with heating, or caulking.

Methods for bonding a collector sheet as a constituent of a gas diffusion electrode to an edging material, according to the invention, will be explained below.

In the case where the collector sheet 4 of a gas diffusion electrode 1 is bonded to a silver sheet 7, fine silver particles 8 are applied to the inner surface of the silver sheet 7. Thereafter, the silver sheet 7 is hot-pressed against the collector sheet 4 with heating at 200 to 400° C. and at a pressure of 10 kg/cm$^2$ or higher. The present inventors have found that this bonding method enables the bonding through the interface where fine silver particles are present to be accomplished more tenaciously and this not only significantly diminishes liquid leakage from the interface and improves electrical conductivity. In this case, the gas diffusion electrode side means not a constituent such as part of the layers thereof but the whole gas diffusion electrode. Consequently, the term "gas diffusion electrode constituents" in the invention means not only part of the layers of the gas diffusion electrode but also the whole gas diffusion electrode, and includes members such as frames bonded to the gas diffusion electrode.

The bonding surface of that peripheral part 11 of the electrode pan 9, which is directly bonded to the gas diffusion electrode 1 to serve a constituent of the gas diffusion electrode 1, has been roughened by sandblasting and plated with silver (see FIG. 3).

Figure 4:
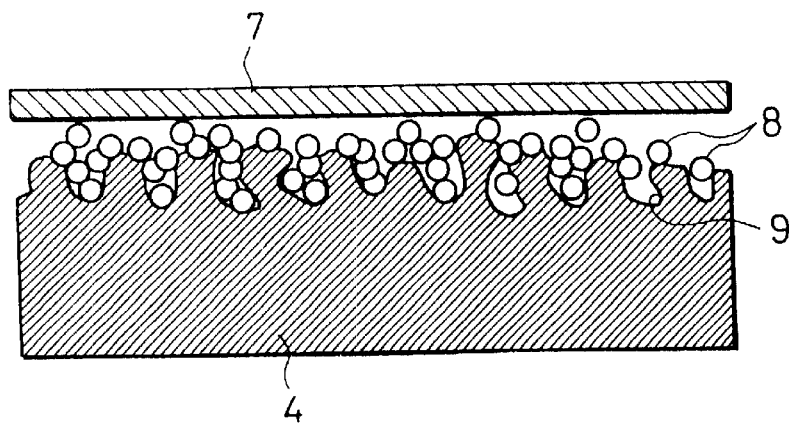
FIG. 4 is a sectional view illustrating an interface having a roughened surface.

FIG. 4 is a sectional view illustrating an interface having a roughened surface. A nickel sheet 4 to be used as a constituent of a gas diffusion electrode 1 is made to have a roughness 9, before being bonded to a silver sheet 7. Use of an anchoring effect enables more tenacious bonding.

A specific bonding method in the case of treating a collector sheet is as follows. The collector sheet is immersed in a slurry of fine silver particles 8 having a diameter of about 1 $\mu$m in ethanol and then dried to obtain a collector 4 having fine silver particles 8 adherent thereto. Spraying may also be used to apply and adhere fine silver particles. The dispersion medium is preferably one which volatilizes completely, such as, e.g., water or an alcohol. In the case where a surfactant or the like has been added for application, use may be made of a method comprising sandwiching the collector sheet between a reaction layer sheet and a gas feed layer sheet, cold-pressing the assemblage to unite it, subsequently removing the surfactant or the like, and then hot-pressing the united structure to produce an electrode. The fine silver particles 8 preferably have a particle diameter of from 10 to 0.1 $\mu$m, and may have a spherical, platy, or linear shape.

For attaining more tenacious bonding, it is preferred to form a roughness at the interface where fine silver particles 8 are to be present, i.e., on the surface of at least one of the gas diffusion electrode and the silver material, e.g., silver sheet 7, as shown in FIG. 4. The formation of a roughness on a bonding surface enables the fine silver particles to penetrate into surface recesses of the roughened material and this structure produces an anchoring effect to attain tenacious bonding. The bonding of silver to a nickel sheet can be accomplished by roughening the surface of the nickel sheet, applying fine silver particles 8 thereto, and hot-pressing the silver particles against the nickel sheet.

The hot-pressing conditions preferably include a temperature of from 200 to 400° C. Temperatures lower than 200° C. are undesirable in that the resultant bonding strength is low, while temperatures higher than 400° C. are undesirable in that the PTFE begins to decompose. A high pressure is preferred because too low pressures result in a low bonding strength. The practical range of pressure is about from 20 to 100 kg/cm$^2$.

The gas diffusion electrode assembly having a structure for connection bonded thereto according to the invention will be explained below.

In the case of fabricating a large electrode, there is a problem that the thin silver sheet in the bonding part has insufficient strength because of the increased length of the connecting part. For heightening the insufficient strength of this thin silver sheet, use can be made of nickel, stainless steel, or another material as a reinforcing material.

In the invention is used a structure for connection which comprises: a reinforcing material for connection having excellent shape retention and satisfactory handleability, for example, a reinforcing material obtained by coating a rigid and tough metal base, e.g., nickel, with silver; and a thin silver sheet for connection attached to the reinforcing material. The silver coating on the nickel base is a coating layer intended to facilitate the bonding of the thin silver sheet for connection to the nickel base.

Figure 9:
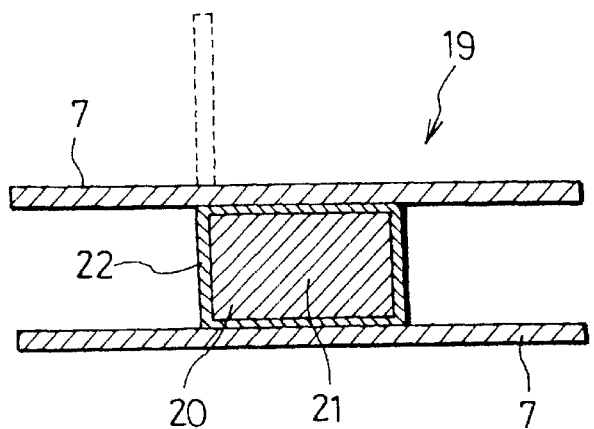
FIG. 9 shows a sectional view of one embodiment of the structure for connection according to the present invention.

FIG. 9 is a sectional view of a structure for connection which is used for bonding gas diffusion electrode pieces to each other. This structure for connection 19 as a whole is constituted by: a reinforcing material 20 which is a silver-clad nickel material comprising a nickel base 21 having a thickness of 0.5 mm and a width of 5 mm, and a 0.05 mm-thick silver material 22 covering the nickel base 21; and thin silver sheets for connection 7.

Specifically, the reinforcing material for connection 19 has a structure formed by sandwiching the reinforcing material 20 on its upper and lower sides between two thin silver sheets for connection 7 having a thickness of 0.1 mm and a width of 15 mm and bonding the sheets 7 to the reinforcing material 20 by hot-pressing the assemblage from the upper and lower sides to form edge parts. Thus, the edge parts formed by the thin silver sheets for connection 7 project at a right angle from the reinforcing material 20 to form a structure for connection 19 having an H-shaped section. The edge parts are not particularly limited as long as the thin silver sheets for connection 7, each having a thickness of 0.1 mm, have been attached so as to project by about 10 mm from each of the upper and lower edges of the reinforcing material 20 and to thus form the shape of the letter "U".

From the standpoint of corrosion resistance, the base of the reinforcing material 20 is preferably nickel or stainless steel. However, the base may be made of a material which itself has slightly insufficient corrosion resistance, such as copper, as long as the whole surface of this base has been completely coated with a silver material. Although a silver-clad nickel material, a silver-plated nickel material, and the like are most preferred, nickel alloys are also preferred.

In the case where the structure 19 is used to connect gas diffusion electrode pieces to each other, the connection can be accomplished in the following manner. One of the projecting parts, e.g., the left upper part, of the thin silver sheets for connection 7 which form the shape of laid "H" in cooperation with the reinforcing material 20 is bent upward as shown in the dotted line in FIG. 9 to increase the distance between the upper and lower projecting parts. An edge part of one of the gas diffusion electrode pieces is placed in the thus-enlarged space between the thin silver sheets for connection 7, and the upward bent part of the thin silver sheet is bent downward to the original position. Thus, the edge part of the gas diffusion electrode piece is sandwiched between the thin silver sheets for connection 7. This assemblage is hot-pressed at 250° C. and 50 kg/cm$^2$ to bond the silver sheets 7 to form a silver frame for the gas diffusion electrode piece. In the case where the whole gas diffusion electrode pieces also are pressed, the applied pressure first concentrates on the connecting part and, thereafter, the whole assemblage is pressed. Consequently, one flat gas diffusion electrode comprising closely connected gas diffusion electrode pieces is obtained. In the case where only the connecting part between gas diffusion electrode pieces is hot-pressed, the gas diffusion electrode is apt to deform. The deformation can be prevented by evenly applying a pressure.

The hot-pressing temperature is preferably from 200 to 400° C. Hot-pressing temperatures lower than 200° C. are undesirable in that the resultant bonding strength is low, while hot-pressing temperatures higher than 400° C. are undesirable in that the PTFE begins to decompose. A high hot-pressing pressure is preferred because too low pressures result in a low bonding strength. However, too high pressures are undesirable in that the results are a change in electrode structure and a decrease in electrode performance. The practical range of hot-pressing pressure is about from 20 to 100 kg/cm$^2$.

The gas diffusion electrode obtained by bonding gas diffusion electrode pieces to each other can be tenaciously fixed through its connecting parts to an electrode pan, feeder rib, electrolytic cell frame, or the like by laser welding or spot welding.

Figure 10:
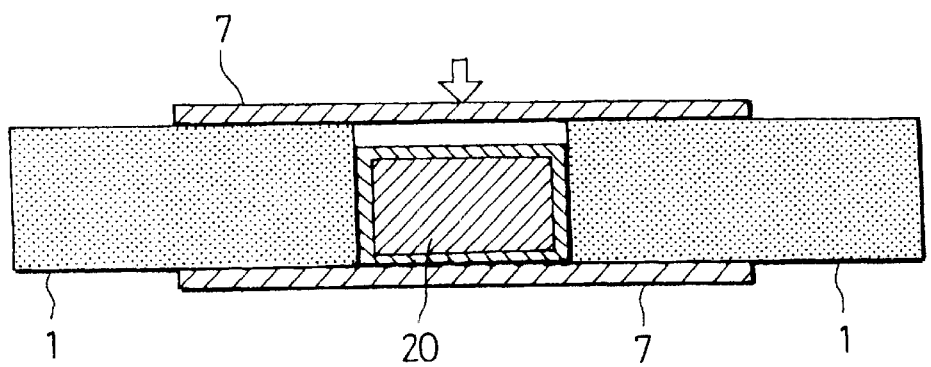
FIG. 10 is a sectional view illustrating two gas diffusion electrode pieces to be connected to each other with a reinforcing material having a smaller thickness than the gas diffusion electrode pieces.

FIG. 10 is a sectional view illustrating a method for connecting two gas diffusion electrode pieces 1 to each other with a silver-clad nickel material as a reinforcing material 20 having a smaller thickness than the gas diffusion electrode pieces 1.

Figure 11:
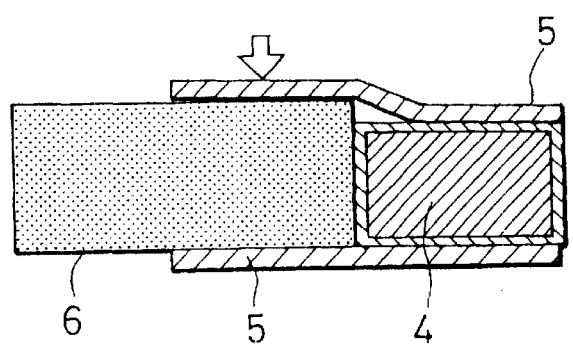
FIG. 11 is a sectional view illustrating the gas diffusion electrode pieces after being connected with the reinforcing material by hot-pressing.

The silver-clad nickel material serving as a reinforcing material 20 is placed on a lower thin silver sheet for connection 7. On this lower thin silver sheet for connection 7 are further placed edge parts of the gas diffusion electrode pieces 1 so that the edge parts respectively come into contact with both sides of the reinforcing material 20. An upper thin silver sheet 7 having a thickness of 0.1 mm is superposed on the edge parts of the gas diffusion electrode pieces 1, and this assemblage is hot-pressed. As a result, the pressing pressure is applied from right above the reinforcing material 20 and, hence, the upper thin silver sheet for connection 7 is bonded to the reinforcing material 20 in the initial stage as shown in FIG. 11.

Thereafter, as the hot-pressing proceeds, the edge parts of the gas diffusion electrode come to have almost the same thickness as the reinforcing material 20 due to the pressing pressure. Thus, the silver-clad nickel material, the thin silver sheets for connection 7, and the gas diffusion electrode pieces 1 are bonded together to form a united structure.

By the use of the reinforcing material 20, comprising a high-strength nickel material, in combination with the thin silver sheets for connection 7, the electrode pieces 1 can be connected to each other through a long connecting part and a large gas diffusion electrode can be easily fabricated. By welding metallic parts of the electrode to, e.g., the feeder rib of an electrolytic cell, an electrolytic cell in which the collection of electrons is easy can be fabricated.

The gas diffusion electrode assembly having a metallic terminal bonded thereto according to the invention will be explained below.

Figure 5:
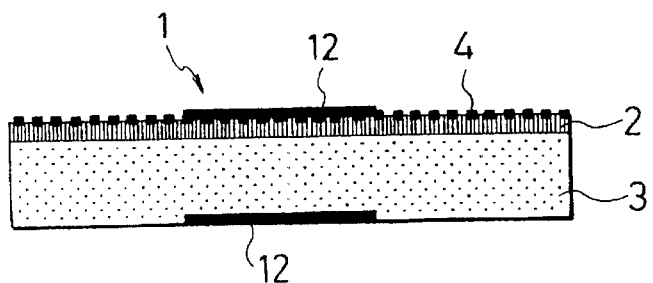
FIG. 5 shows a sectional view of one embodiment of the gas diffusion electrode assembly according to the present invention, which has a metallic terminal bonded thereto.

FIG. 5 is a sectional view of one embodiment of the gas diffusion electrode assembly having a metallic terminal bonded thereto according to the invention. This assembly comprises: a gas diffusion electrode 1 having a multilayer structure comprising a collector sheet 4 which is a silver gauze, a reaction layer 2, and a gas feed layer 3; and metallic terminals 12 which each is a silver disk (diameter, 10 mm; thickness, 0.2 mm) bonded to a corner of the upper or lower surface of the gas diffusion electrode 1 by hot-pressing at 260° C. and an areal pressure of 80 kg/cm² in terms of the pressure applied to the area covered with the disk.

Figure 6:
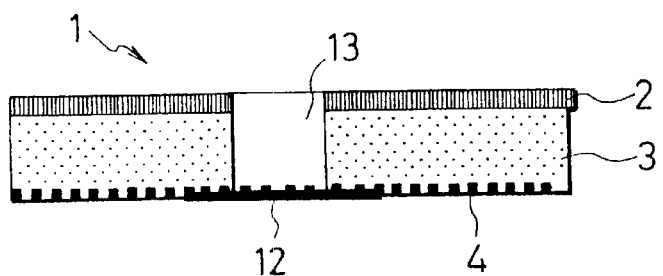
FIG. 6 shows another example of the embodiment of the invention shown in FIG. 5.

FIG. 6 is a sectional view illustrating an embodiment which comprises a gas diffusion electrode 1 having through-holes 13 and metallic terminals 12 bonded to the electrode 1 by hot-pressing. The through-holes 13 have a diameter of 5 mm and have been formed scatteringly in the gas diffusion electrode 1. The silver disks (metallic terminals 12) have been fixed by placing these so as to cover the through-holes 13 and hot-pressing the disks in the same manner. The metallic terminals 12 may be disposed on the upper or lower side of the gas diffusion electrode 1 kept, for example, horizontal. The metallic terminals 12 need not be platy, and may be, for example, in the form of a pin having a rim. The shape of the metallic terminals 12 can be changed to any desired shape such as, e.g., a circular or rectangular shape.

The hot-pressing conditions include a temperature of from the melting point of the fluororesin used to 400° C. The preferred range of temperature is, for example, from 200 to 400° C. Pressing temperatures lower than 200° C. are undesirable in that the resultant bonding strength is low, while pressing temperatures higher than 400° C. are undesirable in that the PTFE begins to decompose. The pressing pressure is preferably 5 kg/cm² or higher because too low pressing pressures result in a low bonding strength. The practical range of pressure is about from 20 to 100 kg/cm².

The metallic terminals 12 bonded to the gas diffusion electrode 1 can be tenaciously fixed to an electron pan by laser welding, spot welding, or screwing.

The gas diffusion electrode assembly having a resinous edging material according to the invention will be explained below.

A resin sheet is attached to a peripheral part of a gas diffusion electrode, and this assembly is supported on a frame of an electrolytic cell through the resin sheet as an edging material so that the edging material constitutes a sealing part. Thus, the gas diffusion electrode is fixed to the electrolytic cell frame while preventing a peripheral part of the electrode from being directly sandwiched between electrolytic cell frames.

A resin sheet is brought into contact with a gas diffusion electrode, and the contact area of the resin sheet is hot-pressed against the electrode under the conditions of a temperature not lower than the melting point of the resin sheet and a pressure of 10 kg/cm² or higher, whereby the resin sheet is tenaciously bonded to the gas diffusion electrode. The gas diffusion electrode having the resin sheet thus bonded thereto has satisfactory handleability. When an electrode pan in which an appropriate groove for fitting has been formed beforehand is used, liquid leakage can be prevented almost completely by forcing part of the resin sheet into the groove together with a packing. In the case where two or more gas diffusion electrodes are attached to a larger electrode pan, almost perfect sealing is attained by welding the collector gauze of each gas diffusion electrode to the electrode pan and then bonding the attached resinous edging materials to each other.

Figure 7:
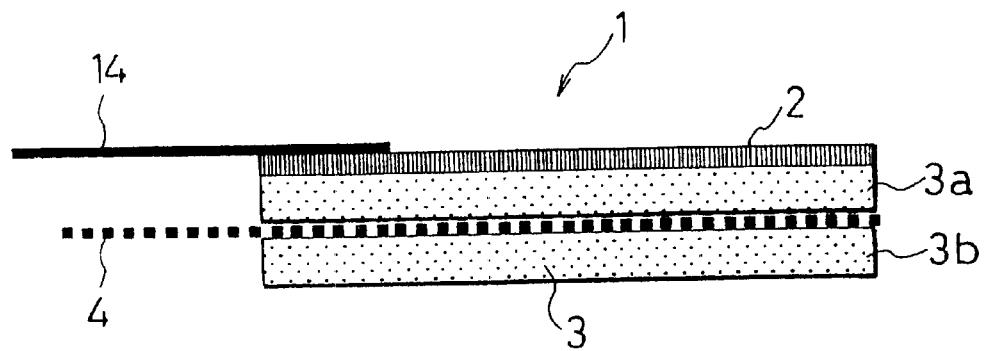
FIG. 7 shows a sectional view of one embodiment of the gas diffusion electrode assembly according to the present invention, which has a resinous edging material.

A resin sheet 14, e.g., a PTFE sheet, is used which has a thickness of 0.05 mm and a size larger than a gas diffusion electrode 1 by about 10 mm for each side. In the center of the PTFE sheet is formed a window of a size smaller than the gas diffusion electrode 1 by about 10 mm for each side. This PTFE sheet 14 having a window is placed on the reaction layer 2. The resultant assemblage is hot-pressed at a temperature of 350° C. and an areal pressure of 50 kg/cm² in terms of the pressure applied to the overlying part of the sheet. Thus, the frame comprising the PTFE sheet is bonded to the gas diffusion electrode 1 (FIG. 7). The thickness of the sheet is desirably about 0.05 mm. Too small sheet thicknesses are undesirable in that the sheet strength is insufficient. On the other hand, sheet thicknesses of 0.2 mm and larger are undesirable in that such a thick sheet cannot cope with the difference in thermal expansion coefficient between the sheet and the gas diffusion electrode and, hence, suffers a deformation in its part bonded to the gas diffusion electrode 1.

The resin sheet 14 need not be constituted by a single sheet, and is not particularly limited in shape as long as it is a platy frame shape. From this standpoint, the resin sheet 14 may be formed not by processing a single sheet but by bonding four slender sheets to each other at end parts thereof to form a frame shape of a given size.

Although the resin sheet 14 is preferably a solid sheet, a porous sheet such as GORE-TEX can also be advantageously used. In the case of a porous sheet such as GORE-TEX, the thickness thereof can be as large as 0.2 mm or more and is preferably in the range of from 0.02 to 0.3 mm.

Examples of the material of the resin sheet 14 include fluororesins. Examples of the fluororesins include polytetrafluoroethylene, polytetrafluoroethylene/perfluoroalkyl vinyl ether copolymers, polytrifluorochloroethylene, polytetrafluoroethylene/hexafluoropropylene copolymers, poly(vinylidene fluoride), polytetrafluoroethylene/ethylene copolymers, and polychlorotrifluoroethylene/ethylene copolymers. Besides such fluororesins, other resins having heat and chemical resistance, such as polypropylene, PPS, and PES, can be used as the material of the resin sheet bonded to the gas diffusion electrode.

For the purpose of enhancing electrical conduction, a silver gauze, silver sheet, silver-plated nickel material, silver-clad nickel sheet, or the like may be press-bonded simultaneously with the bonding of the resin sheet.

The hot-pressing conditions vary depending on the melting temperature of the material of the resin sheet used or that of the fluororesin contained in the multilayer structure. However, the pressing temperature is generally preferably in the range of from 150 to 400° C. Too high pressing temperatures are undesirable in that the sheet of, e.g., PTFE to be bonded to the gas diffusion electrode begins to decompose. The temperature and pressure for the hot-pressing are determined based on the flowability of the individual resins. The practical range of pressing pressure is about from 10 to 100 kg/cm².

The resin frame to be bonded may have such a shape as to cover the whole periphery of the gas diffusion electrode 1. A silver sheet may be sandwiched as a collector between constituent layers of part of the gas diffusion electrode 1.

The present invention will be illustrated in greater detail below, but the invention should not be construed as being limited thereto.

EXAMPLE 1

To 200 parts by weight (hereinafter all parts are by weight) of 4 wt % (hereinafter all percents are by weight) TRITON® X-100 (surfactant) was added 2 parts of hydrophobic carbon black (Denka Black; average particle diameter, 390 Å; manufactured by Denki Kagaku Kogyo K.K.). The resultant mixture was stirred to disperse the carbon black. This carbon black dispersion was treated with an ultrasonic disperser (manufactured by BRANSON; 500 W) for 5 minutes with cooling with water to further disperse the carbon black. As a result, the dispersion came to have an average particle diameter of 1.6 μm. To this dispersion was added 10 parts of a silver colloid (trial product manufactured by Tanaka Kikinzoku Kogyo K.K.; average particle diameter, 0.1 μm). This mixture was homogenized by stirring. Furthermore, 1.5 parts of PTFE dispersion D-1 (average particle diameter, 0.3 μm; manufactured by Daikin Industries, Ltd.) was added thereto, and this mixture was homogenized by stirring. To this dispersion was added 300 parts of isopropyl alcohol to cause self-organization. The resultant mixture was filtered to obtain a material for forming a reaction layer.

Using a rolling method, a sheet comprising a gas feed layer 3a and a reaction layer 2 superposed thereon was produced (see FIG. 2). After this sheet was dried at 80° C. for 3 hours, the surfactant was removed with an ethanol extractor. The sheet was then dried at 80° C. for 5 hours to obtain a reaction layer/gas diffusion layer sheet. This reaction layer/gas diffusion layer sheet was cut into a 11 cm×21 cm rectangular shape.

A gas feed layer sheet 3b was produced in the same manner from the hydrophobic carbon black and PTFE (40%) and was cut into the same size. A 50-mesh silver gauze having a fiber diameter of 0.1 mm was cut into a 12 cm×22 cam rectangular shape. The reaction layer/gas diffusion layer sheet, the silver gauze 4, and the gas feed layer sheet 3b were stacked up in this order as shown in FIG. 1, and this assemblage was pressed at 50 kg/cm$^2$ and 350° C. for 60 seconds to obtain a gas diffusion electrode 1. That part of the silver gauze 4 which projected from the periphery of the gas diffusion electrode 1 was bent toward the reaction layer 2 side.

A silver frame serving as an edging material 7 was produced from a 0.2 mm-thick silver sheet having a 13 cm×23 cm rectangular shape by cutting out an inner part therefrom in a size of 10 cm×20 cm so that a peripheral part of the silver sheet remained in a width of 1.5 cm. This silver frame was superposed on a peripheral part 8 of the gas diffusion electrode 1. The superposed part of this assemblage was hot-pressed at an areal pressure of 100 kg/cm$^2$ and a temperature of 260° C. to obtain a gas diffusion electrode assembly having a silver frame bonded thereto. This assembly had a section such as that shown in FIG. 2.

Subsequently, the gas diffusion electrode assembly obtained above was fixed to an electrode pan 9 by laser welding. Thus, an electrode assembly was obtained in which the gas diffusion electrode was bonded to the frame of the electrode pan 9 as shown in FIG. 3.

This electrode assembly was ascertained to be free from liquid leakage and enable stable electrolysis. Using this electrode assembly as an oxygen cathode, electrolysis of sodium chloride was conducted. As a result, a bath voltage of 1.97 V was obtained under the conditions of 90° C., 32% NaOH, and 30 A/dm$^2$.

EXAMPLE 2

In Example 1, a gas diffusion electrode 1 was produced through hot-pressing and then bonded to a silver sheet 7 (the term "silver sheet 7" is used because a "silver sheet" was used here as an edging material) In this Example, however, a silver-edged gas diffusion electrode assembly was obtained by stacking up the reaction layer/gas feed layer sheet, the silver gauze as a collector sheet 7, the silver sheet 7, and the gas feed layer sheet 3b in this order and pressing the assemblage at 50 kg/cm$^2$ and 350° C. for 60 seconds. Using this electrode assembly as an oxygen cathode, electrolysis of sodium chloride was conducted. As a result, a bath voltage of 1.96 V was obtained under the conditions of 90° C., 32% NaOH, and 30 A/dm$^2$.

The electrode assembly produced in this Example had a structure in which the edging material was interposed between the gas feed layer sheet 3a and the gas feed layer sheet 3b.

EXAMPLE 3

A silver frame was produced from a 0.2 mm-thick silver sheet having a 13 cm×23 cm rectangular shape by cutting out an inner part therefrom in a size of 10 cm×20 cm so that a peripheral part of the silver sheet remained in a 1.5 cm-wide corridor shape. In the same manner as in Example 1, a gas diffusion electrode was obtained which had a size of 11.5 cm×21.5 cm and in which the peripheral part of the silver gauze had been bent toward the reaction layer side. Fine silver particles were applied to the surface of the bent peripheral part of the silver gauze. Thereon was superposed the silver frame obtained above. The superposed part was hot-pressed at an areal pressure of 100 kg/cm$^2$ and a temperature of 260° C. to obtain a silver-framed gas diffusion electrode.

The resistance between the silver frame and the gas diffusion electrode was as low as about one-half the resistance in the case of corresponding conventional assemblies where no fine silver particles were interposed. The peel strength of the silver frame in the assembly obtained above was about 1.6 times the peel strength in the assemblies where no fine silver particles were interposed.

EXAMPLE 4

That surface of an electrode pan made of nickel to which a gas diffusion electrode was to be bonded was sandblasted with a #1,200 silicon carbide powder to satinize the surface. The satinized surface was plated with silver in a thickness of 2 μm. The rough surface of the resultant silver deposit was coated with fine silver particles. Thereafter, a silver sheet having a thickness of 0.1 mm was pressed against the silver deposit at 50 kg/cm$^2$ and 230° C. for 60 seconds to bond the silver sheet to the electrode pan. As a result, it was found that a conventional hot-pressing temperature could be lowered by from 20 to 30° C. in obtaining the same tensile strength.

Furthermore, the satinized nickel surface was coated with fine silver particles without being silver-plated, and a silver sheet having a thickness of 0.2 mm was pressed thereagainst at 380° C. and 200 kg/cm$^2$ for 60 seconds to bond the silver sheet to the nickel plate. As a result, the silver sheet was ascertained to have a sufficient bonding strength.

EXAMPLE 5

A reaction layer/gas feed layer sheet obtained in the same manner as in Example 1 was cut into the same size. A gas feed layer sheet obtained in the same manner as in Example 1 was superposed thereon and this assemblage was pressed in the same manner to obtain an electrode.

That part of the silver gauze which projected from the periphery of the gas diffusion electrode was bent toward the reaction layer side. In the gas diffusion electrode produced, holes having a diameter of 5 mm were formed at intervals of 5 cm with respect to each of the length and width directions. Silver terminals having a thickness of 0.2 mm and a diameter of 1 cm and having a projection in the center on one side were fitted into the holes.

A silver belt having a thickness of 0.2 mm and a width of 1 cm was used to form a silver frame having inner-opening dimensions of 30 cm×120 cm. This silver frame was superposed on the gas diffusion electrode and the resultant assemblage was hot-pressed at a pressure of 50 kg/cm² and a temperature of 300° C. to obtain a gas diffusion electrode having a silver frame and silver terminals.

Subsequently, the surrounding silver frame and the silver terminals were laser-welded to an electrode pan to thereby bond the gas diffusion electrode to the electrode pan. A larger electrode size is obtained by welding such electrodes arranged side by side to an electrode pan.

The electrode assembly produced above was ascertained to be free from liquid leakage and enable stable electrolysis. Using this electrode assembly as an oxygen cathode, electrolysis of sodium chloride was conducted. As a result, a bath voltage of 1.98 V was obtained under the conditions of 90° C., 32% NaOH, and 30 A/dm².

The gas diffusion electrode and the silver terminals could be tenaciously bonded to the electrode pan in such a manner as not to cause liquid or gas leakage. It has thus become possible to connect a gas diffusion electrode to an electrode pan and a feeder through silver terminals.

The silver terminals which have been bonded to an electrode pan or electrolytic cell can be fixed to a feeder by laser welding, press bonding with resistance heating, caulking, or the like. Thus, an extremely stable oxygen cathode was obtained which, when attached to an electrolytic cell and used to operate the cell over long, enabled the electrolysis to be conducted at a low feed resistance without causing liquid leakage.

EXAMPLE 6

To 200 parts of water containing 4% TRITON® X-100 (surfactant) was added 7 parts of hydrophilic carbon black (AB-12; average particle diameter, 390 Å; manufactured by Denki Kagaku Kogyo K.K.). The resultant mixture was stirred for 10 minutes to disperse the hydrophilic carbon black. Thereto was added 3 parts of hydrophobic carbon black (No. 6; average particle diameter, 490 Å; manufactured by Denki Kagaku Kogyo K.K.). The resultant mixture was stirred for 10 minutes to disperse the hydrophobic carbon black. To this dispersion was added 4 parts of a silver colloid (trial product manufactured by Tanaka Kikinzoku Kogyo K.K.; average particle diameter, 0.1 µm) This mixture was homogenized by stirring. Furthermore, 4 parts of PTFE dispersion D-1 (average particle diameter, 0.3 µm; manufactured by Daikin Industries, Ltd.) was added thereto, and this mixture was homogenized by stirring. To this dispersion containing PTFE was added 300 parts of isopropyl alcohol to cause self-organization. The resultant mixture was filtered to obtain a material for forming a reaction layer.

A material for forming a gas feed layer was prepared in the following manner. To 200 parts of water containing 4% TRITON® X-100 (surfactant) was added 6 parts of hydrophobic carbon black (No.6; average particle diameter, 490 Å; manufactured by Denki Kagaku Kogyo K.K.). The resultant mixture was stirred for 10 minutes to disperse the hydrophobic carbon black. Furthermore, 4 parts of PTFE dispersion D-1 (average particle diameter, 0.3 µm; manufactured by Daikin Industries, Ltd.) was added thereto, and this mixture was stirred to mix the PTFE. To this dispersion was added 200 parts of isopropyl alcohol to cause self-organization.

Using the materials thus obtained, a resin-edged gas diffusion electrode such as that shown in FIG. 7 was obtained in the following manner. A sheet comprising a gas feed layer 3a and a reaction layer 2 superposed thereon was produced by a rolling method in the same manner as in Example 1. After this sheet was dried at 80° C. for 3 hours, the surfactant was removed with an ethanol extractor. The sheet was then dried at 80° C. for 5 hours to obtain a reaction layer/gas feed layer sheet. The two-layer sheet thus obtained was cut into a 11 cm×21 cm rectangular shape.

A gas feed layer sheet 3b separately produced in the same manner was cut into the same size. A 50-mesh silver gauze 4 having a fiber diameter of 0.1 mm was cut into a 12 cm×22 cm rectangular shape.

The two-layer sheet, the silver gauze 4, and the gas feed layer sheet 3b were stacked up in this order, and this assemblage was hot-pressed at 50 kg/cm² and 350° C. for 60 seconds to obtain a gas diffusion electrode 1 in which part of the silver gauze 4 projected from the periphery of the gas feed layer sheet 3.

From a 0.05 mm-thick PTFE sheet having a 13 cm×23 cm rectangular shape, an inner part was cut out in a size of 10 cm×20 cm so that a peripheral part of the PTFE sheet remained in a width of 1.5 cm. Thus, a PTFE frame was produced which had such a size that it was larger than the gas diffusion electrode and partly overlay part of the gas diffusion electrode. Subsequently, the PTFE frame was superposed on the gas diffusion electrode so that the PTFE frame extended outward beyond the periphery of the gas diffusion electrode evenly throughout the whole periphery. This assemblage was hot-pressed at an areal pressure of 50 kg/cm² in terms of the pressure applied to the superposed part and at a temperature of 340° C. Thus, resin-edged gas diffusion electrodes were obtained in which the PTFE frame (resin sheet 14) partly projected from the periphery of the gas feed layer sheet 3 and which had a structure such as that shown in FIG. 7.

Figure 8:
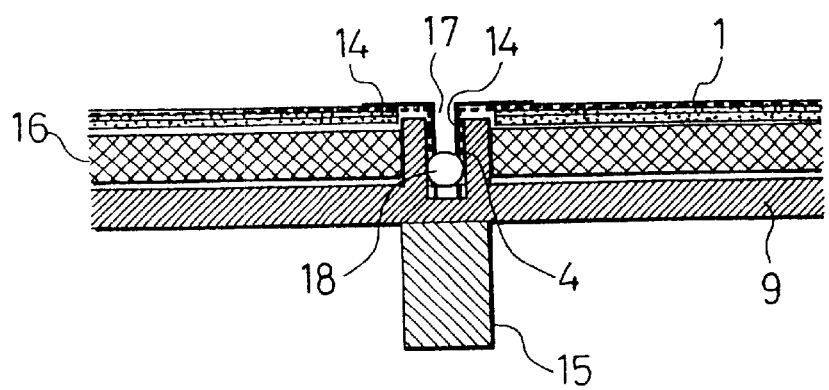
FIG. 8 shows a sectional view of an example of the fixing manner of resin-edged gas diffusion electrodes according to the invention with respect to an electrode pan.

FIG. 8 is a sectional view of an example of a part where the resin-edged gas diffusion electrodes 1 obtained above were fixed to an electrode pan 9 (cathode pan).

The electrode pan 9 was disposed on the upper end of a feeder rib 15. On the electrode pan 9 were disposed gas chamber porous materials 16 in plane arrangement. The electrode pan 9 had a groove for fitting 17 having a depth of 5 mm and a width of 3 mm formed beforehand between adjacent gas chamber porous materials 16. On the gas chamber porous materials 16 were superposed the gas diffusion electrodes 1. With respect to each gas diffusion electrode, that part of the PTFE frame (resin sheet 14) which projected from the periphery of the gas feed layer sheet 3 and the projecting part of the silver gauze 4 were introduced into the groove 17. A cylindrical packing 18 having a diameter of 3 mm was further forced into the groove 17. Thus, the gas diffusion electrodes 1 were fixed to the electrode pan 9.

Due to the elasticity of the cylindrical packing, watertight sealing was attained and liquid leakage was eliminated. Since the silver gauze 4 and the electrode pan 9 were substantially in areal contact with each other, the electrode assembly had an electrical resistance reduced to a negligible level.

Using this electrode assembly as an oxygen cathode, electrolysis of sodium chloride was conducted. As a result, a bath voltage of 2.05 V was obtained under the conditions of 90° C., 32% NaOH, and 30 A/dm². This electrode assembly was ascertained to be free from liquid leakage and enable stable electrolysis.

In this Example was shown an electrode assembly employing an electrode pan 9 having a groove for fitting 17 and a cylindrical packing 18 forced into the groove 17. However, there is no need of always forming the groove for fitting 17.

EXAMPLE 7

Connecting structures 19 having the shape of the letter "H" were produced which, as shown in FIG. 9, employed as a reinforcing material 20 a silver-clad nickel material comprising a nickel base 21 having a thickness of 0.5 mm and a width of 5 mm and a 0.05 mm-thick silver material 22 with which the nickel base was covered. Two thin silver sheets for connection 7 having a thickness of 0.1 mm and a width of 15 mm had been bonded respectively to the upper and lower sides of the reinforcing material 20 by pressing at 10 kg/cm$^2$ with heating at 250° C. Connecting structures for use on edges were produced by press-bonding two thin silver sheets for connection 7 having a thickness of 0.1 mm and a width of 10 mm to the upper and lower sides of the reinforcing material 20 so as to form the shape of the letter "U".

Three gas diffusion electrode pieces were produced which each employed as a collector a 0.7 mm-thick silver gauze having a size of 15 cm×23 cm. These electrode pieces were arranged side by side. The adjacent pieces were connected with the H-shaped connecting structures 1, while the U-shaped connecting structures 1 were fitted to the outer edges of the outer gas diffusion electrode pieces. The resultant assemblage was hot-pressed at a temperature of 260° C. and a pressure of 50 kg/cm$^2$ for 60 seconds to obtain an electrode having a size of 15 cm×70 cm. This electrode could be used as a single electrode plate in an ion-exchange membrane type cell for sodium chloride electrolysis having a width of 10 cm and a length of 60 cm. The electrolysis of sodium chloride could be stably conducted.

A metallic edging material can be tenaciously bonded to a peripheral part of a gas diffusion electrode without causing liquid or gas leakage. It has hence become possible to fix this gas diffusion electrode to an electrode pan or feeder through the edging material. As a result, ordinary techniques for metal processing can be used. Namely, laser welding, press bonding with resistance heating, press bonding with heating, caulking, or the like can be used to fix the metal-edged gas diffusion electrode to a feeder bonded to an electrode pan or electrolytic cell. In addition, a stable oxygen cathode can be obtained which, when attached to an electrolytic cell and used to conduct electrolysis over long, attains a low feed resistance and is free from liquid leakage.

When fine silver particles are used for bonding a gas diffusion electrode to a silver sheet as an edging material, the gas diffusion electrode is more tenaciously bonded to the silver sheet. The resultant electrode assembly therefore has significantly improved handleability. In particular, roughening at least one of the bonding surfaces beforehand is effective in obtaining a reduced electrical resistance and improved electrolytic performance because fine silver particles penetrate into inner parts of the electrode.

Furthermore, by using the structure for connection according to the invention, gas diffusion electrodes can be easily connected to each other and a large gas diffusion electrode can hence be obtained. The structure for connection is effective also in electricity feeding and can be fixed by laser welding, press bonding with resistance heating, caulking, or the like to a feeder bonded to an electrolytic cell.

The gas diffusion electrode having a metallic terminal has a high bonding strength between the gas diffusion electrode and the metallic terminal. The metallic terminal can be disposed in a large number to obtain enhanced electrical conductivity. This gas diffusion electrode can be tenaciously connected to an electrode pan or the like through the metallic terminals and hence be easily attached, for example, to an electrolytic cell. As a result, a stable oxygen cathode can be obtained which, even when used to conduct electrolysis over long, attains a low feed resistance and is free from liquid leakage.

A resin sheet as an edging material can be tenaciously bonded to a peripheral part of a gas diffusion electrode without causing liquid or gas leakage. Since a peripheral part of the resin sheet, which is flexible and has high tensile strength, is exposed from the periphery of the gas diffusion electrode, techniques such as bending and caulking can be used to fix the electrode. In addition, a larger electrode can be easily fabricated by fusion-bonding the resin sheet of one such gas diffusion electrode to that of another. By this method, liquid leakage can be completely prevented.

While the invention has been described in detail and with reference to specific embodiments thereof, it will be apparent to one skilled in the art that various changes and modifications can be made therein without departing from the spirit and scope thereof.

What is claimed is:

1. A gas diffusion electrode assembly comprising:
   carbon black;
   polytetrafluoroethylene;
   a gas diffusion electrode; and
   a metallic edging material bonded to a peripheral part of the electrode.

2. The gas diffusion electrode assembly of claim 1, wherein the metallic edging material comprises a metal selected from the group consisting of silver, silver alloys, gold, platinum and palladium or comprises nickel or a nickel-based alloy, coated with any of these metals.

3. An oxygen cathode comprising the gas diffusion electrode assembly of claim 1.

4. A sodium chloride electrolytic cell comprising the oxygen cathode of claim 3.

* * * * *